United States Patent
Nouda et al.

(10) Patent No.: US 9,665,326 B2
(45) Date of Patent: May 30, 2017

(54) IMAGE DISPLAY CONTROL DEVICE FOR DISPLAYING A PRINT PREVIEW FOR BORDERLESS PRINTING

(71) Applicant: SEIKO EPSON CORPORATION, Tokyo (JP)

(72) Inventors: Shuji Nouda, Shiojiri (JP); Shuichi Shima, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/925,144

(22) Filed: Oct. 28, 2015

(65) Prior Publication Data

US 2016/0124691 A1    May 5, 2016

(30) Foreign Application Priority Data

Oct. 31, 2014  (JP) ................. 2014-223666

(51) Int. Cl.
    G06F 3/12        (2006.01)
(52) U.S. Cl.
    CPC .......... *G06F 3/1256* (2013.01); *G06F 3/1205* (2013.01); *G06F 3/1285* (2013.01)
(58) Field of Classification Search
    CPC ................................................. G06F 3/1256
    See application file for complete search history.

(56) References Cited

U.S. PATENT DOCUMENTS

| | | | |
|---|---|---|---|
| 2003/0053096 A1* | 3/2003 | Nagata ................ | B41J 11/0065 358/1.9 |
| 2003/0065590 A1* | 4/2003 | Haeberli ............ | G06Q 30/0621 705/26.5 |
| 2006/0221369 A1* | 10/2006 | Inoue .................... | G06F 3/1204 358/1.13 |
| 2007/0036588 A1* | 2/2007 | Momose ............... | G06F 3/1205 399/182 |
| 2012/0060084 A1* | 3/2012 | Takada ................. | G06F 3/1204 715/234 |
| 2015/0002565 A1* | 1/2015 | Maeda ................... | B41J 11/003 347/5 |
| 2016/0026117 A1* | 1/2016 | Furukata .............. | G03G 15/095 399/264 |

FOREIGN PATENT DOCUMENTS

| | | |
|---|---|---|
| JP | 2003-177898 A | 6/2003 |
| JP | 2006-252369 A | 9/2006 |
| WO | WO 2004/102373 A1 | 11/2004 |

* cited by examiner

*Primary Examiner* — Benjamin O Dulaney
(74) *Attorney, Agent, or Firm* — Foley & Lardner LLP (57) ABSTRACT

An image display control device includes a display unit that displays a print result of an image to be printed on a paper by a printing device as a pre-display image before the printing is performed and a PC that controls the pre-display image displayed on the display unit. The PC causes the display unit to display the pre-display image, which is displayed when the printing device prints the image on an area to be printed on the paper without margins, by dividing the pre-display image into a print area which is set so as to correspond to the area to be printed, a protrusion area which is outside the print area and where a printing operation of the image is performed by the printing device, and a cutoff area which is outside the protrusion area and where the printing operation of the image is not performed.

5 Claims, 6 Drawing Sheets

FIG. 6C

IMAGE DISPLAY CONTROL DEVICE FOR DISPLAYING A PRINT PREVIEW FOR BORDERLESS PRINTING

BACKGROUND

1. Technical Field

The present invention relates to an image display control device, a print result pre-display method, and a print result pre-display program, which previously display a print result of a printing device such as, for example, a printer.

2. Related Art

When an image such as a photograph and characters is printed on a medium by using a printing device such as, for example, a printer, a preview image (a pre-display image) of a print result may be displayed on a print setting screen of the printing device. Further, recently, demand for borderless printing in which an image is printed in a state in which no margin is included in a medium increases, and when the borderless printing is performed, the size of the preview image is enlarged so that the border of the image runs off the border of the medium. A print result of the borderless printing can be checked before printing by displaying the preview image enlarged as described above while changing a display format of each of a first area positioned on the medium and a second area that runs off the medium in an image area in the print setting screen (for example, see Patent Document 1).

International Publication No. 2004/102373 is an example of related art.

By the way, media used for printing may have variations in the size of the medium and in a transportation position and a transportation posture during transportation due to a manufacturing tolerance and the like. Therefore, in the borderless printing, even when an image element that is not desired to be printed among image elements located near the border in the preview image is located in the second area that runs off the medium in the preview image, the image element may be printed on the medium when the image element is actually printed. In other words, in a print result pre-display method of the related art, it is difficult to accurately know a print result of the borderless printing.

The invention is made in view of the above situation and an object of the invention is to provide an image display control device, a print result pre-display method, and a print result pre-display program, where the print result of the borderless printing that prints an image in a state in which no margin is included in the medium can be accurately known by seeing a pre-display image before printing.

SUMMARY

Hereinafter, a means to solve the above problem and functional effects of the means will be described. An image display control device that solves the above problem includes a control unit that controls a pre-display image displayed on a display unit that displays a print result of an image to be printed on a medium by a printing device as the pre-display image before the printing is performed. The control unit causes the display unit to display the pre-display image, which is displayed when the printing device prints the image on an area to be printed on the medium without margins, by dividing the pre-display image into a first area that is set corresponding to the area to be printed, a second area which is outside the first area and where a printing operation of the image is performed by the printing device, and a third area which is outside the second area and where the printing operation of the image is not performed.

According to this configuration, an area located outside the first area that is set so as to correspond to the area to be printed in the pre-display image is divided into the second area where the printing operation is performed and the third area where the printing operation is not performed and displayed, so that it is possible to know an area where the printing operation is performed and an area where the printing operation is not performed in the image area of the pre-display image. Therefore, it is possible to accurately know a print result of the borderless printing that prints an image in a state in which no margin is included in a medium by seeing the pre-display image before printing.

In the image display control device, it is preferable that the first area, the second area, and the third area in the pre-display image are displayed in different display formats respectively. According to this configuration, it is possible to visibly and distinctly display the first area, the second area, and the third area in the pre-display image.

In the image display control device, it is preferable that the pre-display image is displayed in a display format in which transparency of the third area where the printing operation is not performed by the printing device is higher than that of the first area and the second area where the printing operation is performed by the printing device.

According to this configuration, in the pre-display image, the third region is displayed at a degree of transparency higher than that of the first region and the second region and the third region is difficult to see visually, so that it is possible to display an area where the printing operation is performed by the printing device in a more visible manner than an area where the printing operation is not performed.

A print result pre-display method that solves the above problem is a print result pre-display method that displays a print result of an image to be printed on a medium by a printing device as a pre-display image before the printing is performed. The print result pre-display method displays the pre-display image, which is displayed when the printing device prints the image on an area to be printed on the medium without margins, by dividing the pre-display image into a first area that is set corresponding to the area to be printed, a second area which is outside the first area and where a printing operation of the image is performed by the printing device, and a third area which is outside the second area and where the printing operation of the image is not performed.

According to this configuration, it is possible to obtain the same functional effects as those of the image display control device described above. A print result pre-display program that solves the above problem is a print result pre-display program to be executed by a control unit in an image display control device including the control unit that controls a pre-display image displayed on a display unit that displays a print result of an image to be printed on a medium by a printing device as the pre-display image before the printing is performed. The print result pre-display program causes the control unit to perform a display processing step that displays the pre-display image, which is displayed when the printing device prints the image on an area to be printed on the medium without margins, by dividing the pre-display image into a first area that is set corresponding to the area to be printed, a second area which is outside the first area and where a printing operation of the image is performed by the printing device, and a third area which is outside the second area and where the printing operation of the image is not performed.

According to this configuration, it is possible to obtain the same functional effects as those of the image display control device described above.

BRIEF DESCRIPTION OF THE DRAWINGS

The invention will be described with reference to the accompanying drawings, wherein like numbers reference like elements.

FIGS. 6A to 6C are schematic diagrams showing a flow of editing process of a pre-display image, which is performed when the borderless printing is set.

DESCRIPTION OF EXEMPLARY EMBODIMENT

Hereinafter, an image display control device that controls a pre-display image of a print result and a print result pre-display method that is performed in the image display control device based on a print result pre-display program will be described with reference to FIGS. 1 to 6C.

Figure 1:
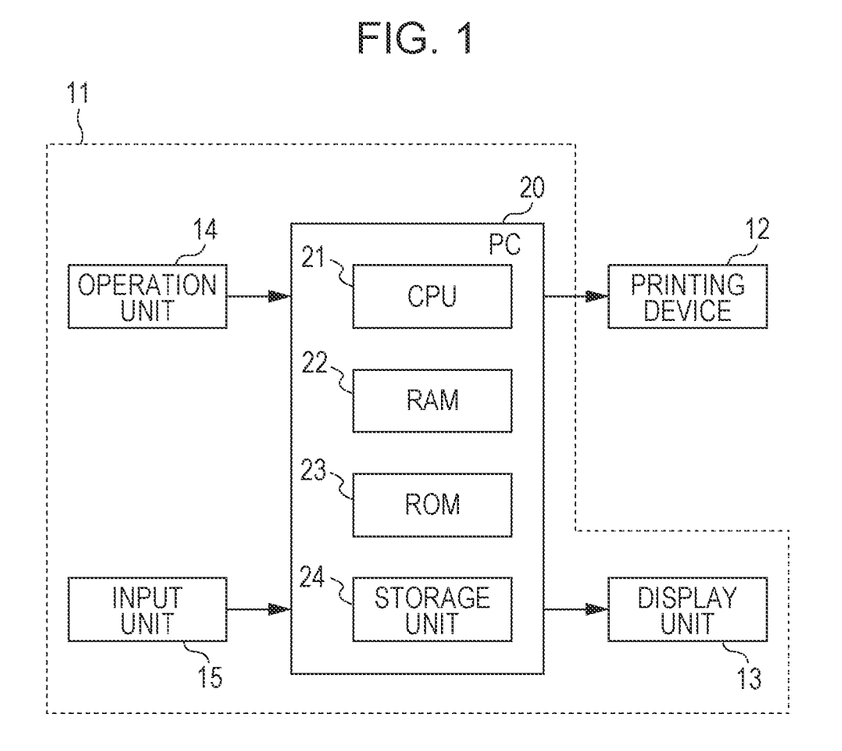
FIG. 1 is a block diagram showing an electrical configuration of an image display control device.

As shown in FIG. 1, an image display control device 11 includes a PC 20 that functions as a control unit. A printing device 12, which is represented by, for example, a printer, is communicably connected to the PC 20. The image display control device 11 further includes a display unit 13, an operation unit 14, and an input unit 15, each of which is communicably connected to the PC 20. The PC 20 includes a CPU 21, a RAM 22, a ROM 23, and a storage unit 24.

The printing device 12 is controlled by the PC 20 that also functions as a print control device. The printing device 12 prints an image on a paper, which is an example of a medium, based on image data and print setting data which are transmitted from the PC 20.

The display unit 13 is composed of, for example, a display, a monitor, or the like. The display unit 13 displays a pre-display image 100 of a print result, which will be printed on a paper by the printing device 12 based on a control of the PC 20, on a print setting screen 30 (see FIG. 2).

The operation unit 14 is composed of, for example, a mouse, a keyboard, and the like. The operation unit 14 is used to input operation information when displaying the print setting screen 30 on the display unit 13 and when instructing an editing process of the pre-display image 100 displayed on the print setting screen 30 to the PC 20. The input unit 15 is communicably connected to, for example, at least one of a predetermined server, an external network, and a readable storage medium, and is provided so as to be able to input various data to the PC 20 from outside the PC 20.

The CPU 21 included in the PC 20 controls the printing device 12 and the image display control device 11 based on various programs stored in the ROM 23 and the storage unit 24. The RAM 22 is a memory that temporarily stores various programs and data. The ROM 23 is a memory that stores various programs to be executed by the CPU 21.

The storage unit 24 stores various programs including the print result pre-display program to be executed by the CPU 21 and image data to be printed on a paper by the printing device 12. The various programs including the print result pre-display program and the image data may be inputted from outside through the input unit 15.

Figure 2:
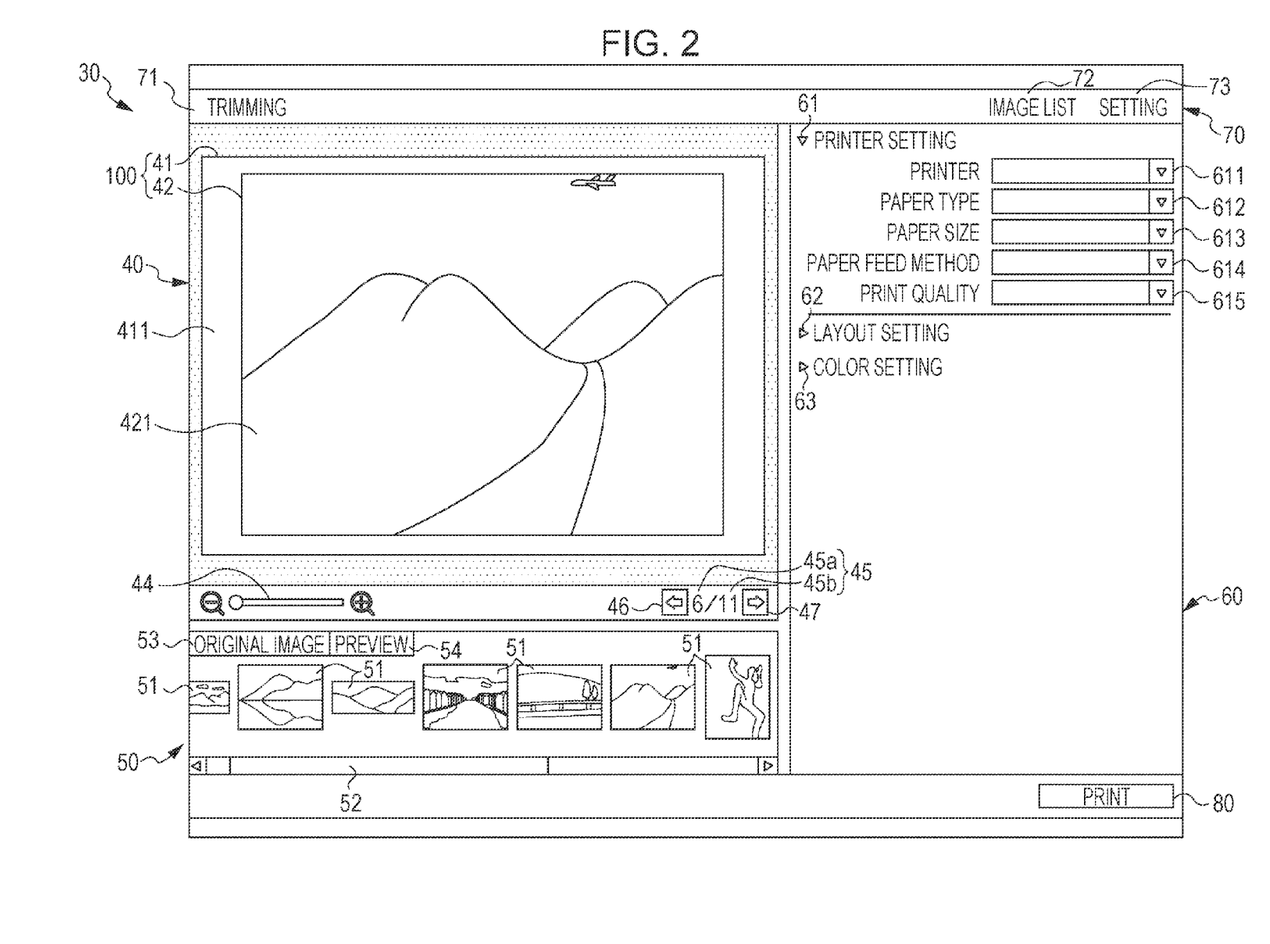
FIG. 2 is a schematic diagram showing a print setting screen.

Next, the print result pre-display method that is performed based on execution of the print result pre-display program in the image display control device 11 will be described. As shown in FIG. 2, when the print result pre-display program stored in the storage unit 24 is executed by the CPU 21, the print setting screen 30 is displayed on the display unit 13. At this time, it is possible to edit the pre-display image 100, which is an image of a print result of an image to be printed on a paper, on the print setting screen 30 by operating a cursor (not shown in the drawings), which is also displayed on the display unit 13, by using the operation unit 14. Image data that is selected by a user in advance before the print result pre-display program is executed is reflected on the pre-display image 100 displayed on the print setting screen 30.

A layout window 40, an image list window 50, and a setting window 60 are displayed on the print setting screen 30. A tool bar 70 is displayed in an upper portion of the print setting screen 30. Further, a print button 80 is displayed in the lower left corner of the print setting screen 30.

The layout window 40 is displayed in a portion from the center to the left side of the print setting screen 30. The pre-display image 100 is displayed on the layout window 40. The pre-display image 100 includes a paper image 41 representing a paper which is a medium and a picture image 42 representing an image to be printed. In the print setting screen 30 immediately after start-up, the picture image 42 is resized and displayed while the aspect ratio of the picture image 42 is maintained so that the picture image 42 is set in an area 411 to be printed, which is an area on the paper image 41. The aspect ratio of the picture image 42 in the present embodiment is different from the aspect ratio of the paper image 41. During printing, an image of a portion overlapping with the paper image 41, that is, an image set in the area 411 to be printed, is printed on the paper.

In a portion below the layout window 40, an enlarging slide bar 44, page information 45, a page backward button 46, and a page forward button 47 are displayed. Specifically, the enlarging slide bar 44 is displayed in the lower left area of the layout window 40 and the page information 45, the page backward button 46, and the page forward button 47 are displayed in the lower right area of the layout window 40. When operating the enlarging slide bar 44, it is possible to enlarge the pre-display image 100 displayed in the layout window 40. The magnification ratio of the pre-display image 100 displayed on the print setting screen 30 immediately after the start-up is one, which is the minimum size of display.

The page information 45 includes a total number 45b of pages of thumbnail image 51 displayed in the image list window 50 described later and a displayed page number 45a that indicates a page number of the thumbnail image 51 reflected in the picture image 42 displayed in the layout window 40.

As shown in FIG. 2, in the present embodiment, when seeing the page information 45, it is known that the total number 45b of pages of thumbnail image 51 displayed in the image list window 50 is "11" and the displayed page number 45a of the thumbnail image 51 reflected in the picture image 42 is "6". In the print setting screen 30 immediately after start-up, "1" is displayed as the displayed page number 45a and an image of a first page is displayed as the picture image 42 in the layout window 40.

Here, when the page backward button 46 and the page forward button 47 displayed adjacent to the page information 45 are selected, the picture image 42 displayed in the layout window 40 is changed to an image of the previous page or an image of the next page. If the page backward button 46 is selected when the value of the displayed page number 45a is "1", and if the page forward button 47 is selected when the displayed page number 45a is equal to the total number 45b of pages, the selection is invalidated.

The image list window 50 is displayed below the layout window 40 in the print setting screen 30. The size of the image list window 50 in the horizontal direction is equal to the size of the layout window 40 in the horizontal direction. In the image list window 50, a plurality of images selected in advance are aligned and displayed in the horizontal direction as the thumbnail images 51. One thumbnail image 51 selected from the displayed thumbnail images 51 is displayed as the picture image 42 included in the pre-display image 100 in the layout window 40. By operating a slide bar 52 displayed in a lower portion of the image list window 50, it is possible to display the thumbnail images 51 (eighth to eleventh images in FIG. 2) that are not displayed in the current image list window 50 from among the thumbnail images 51 selected in advance.

When an original image button 53 or a preview button 54 provided in an upper left portion of the image list window 50 is selected, a display format of the displayed thumbnail images 51 is changed. The display format of the thumbnail images 51 displayed in the image list window 50 shown in FIG. 2 is a display format of when the original image button 53 is selected, and when the preview button 54 is selected, the thumbnail images 51 are displayed by the paper image 41 and the picture image 42 in the same manner as the pre-display image 100 displayed in the layout window 40.

The setting window 60 is displayed on the right side of the layout window 40 and the image list window 50 in the print setting screen 30. In the setting window 60, from up to down, a total of three columns, which are a printer setting column 61, a layout setting column 62, and a color setting column 63, are sequentially aligned and displayed in the vertical direction. When each setting column 61, 62, or 63 is selected, the selected column is opened or closed. When the setting columns 61, 62, and 63 are opened, various print setting items such as the size of paper used in the printing device 12, the setting of print quality, and the print direction are displayed, so that it is possible to select any print settings.

The print settings selected in the setting window 60 are reflected on the pre-display image 100 displayed in the layout window 40. As shown in FIG. 2, the setting window 60 in the print setting screen 30 immediately after the start-up is displayed in a state in which only the printer setting column 61 is opened and the layout setting column 62 and the color setting column 63 are closed.

The tool bar 70 is displayed above the layout window 40 and the setting window 60 in the print setting screen 30. In the tool bar 70, three panels 71, 72, and 73, which are a trimming panel 71, an image list panel 72, and a setting panel 73, are displayed. In the present embodiment, the trimming panel 71 is displayed on the left side of the tool bar 70 and the image list panel 72 and the setting panel 73 are displayed on the right side of the tool bar 70.

When the trimming panel 71 is selected, a trimming screen not shown in the drawings is newly displayed on the display unit 13. In the trimming screen, it is possible to trim (cut) the picture image 42 displayed in the layout window 40 into an arbitrary size. The picture image 42 trimmed in the trimming screen is reflected on the pre-display image 100 in the layout window 40.

Figure 3:
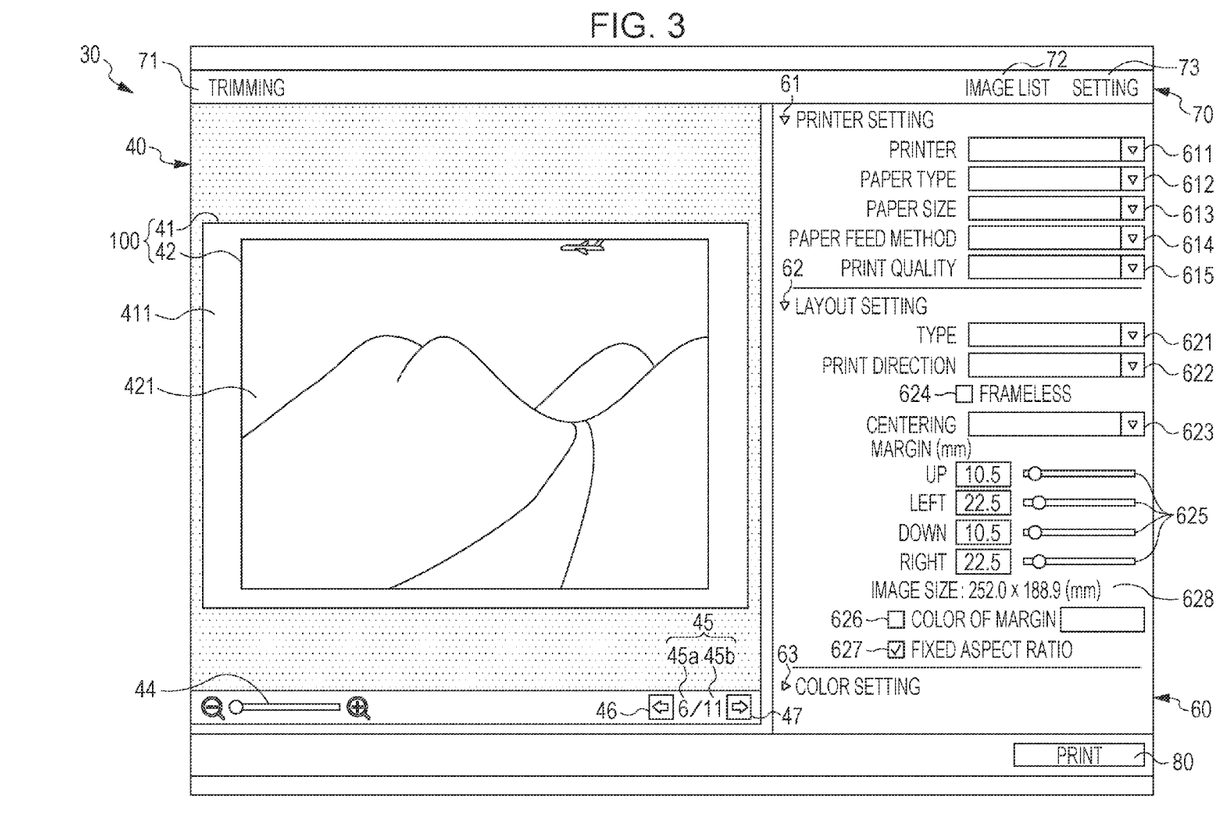
FIG. 3 is a schematic diagram showing a print setting screen when an image list window is hidden from a state of FIG. 2 and a layout setting column is opened.
Figure 4:
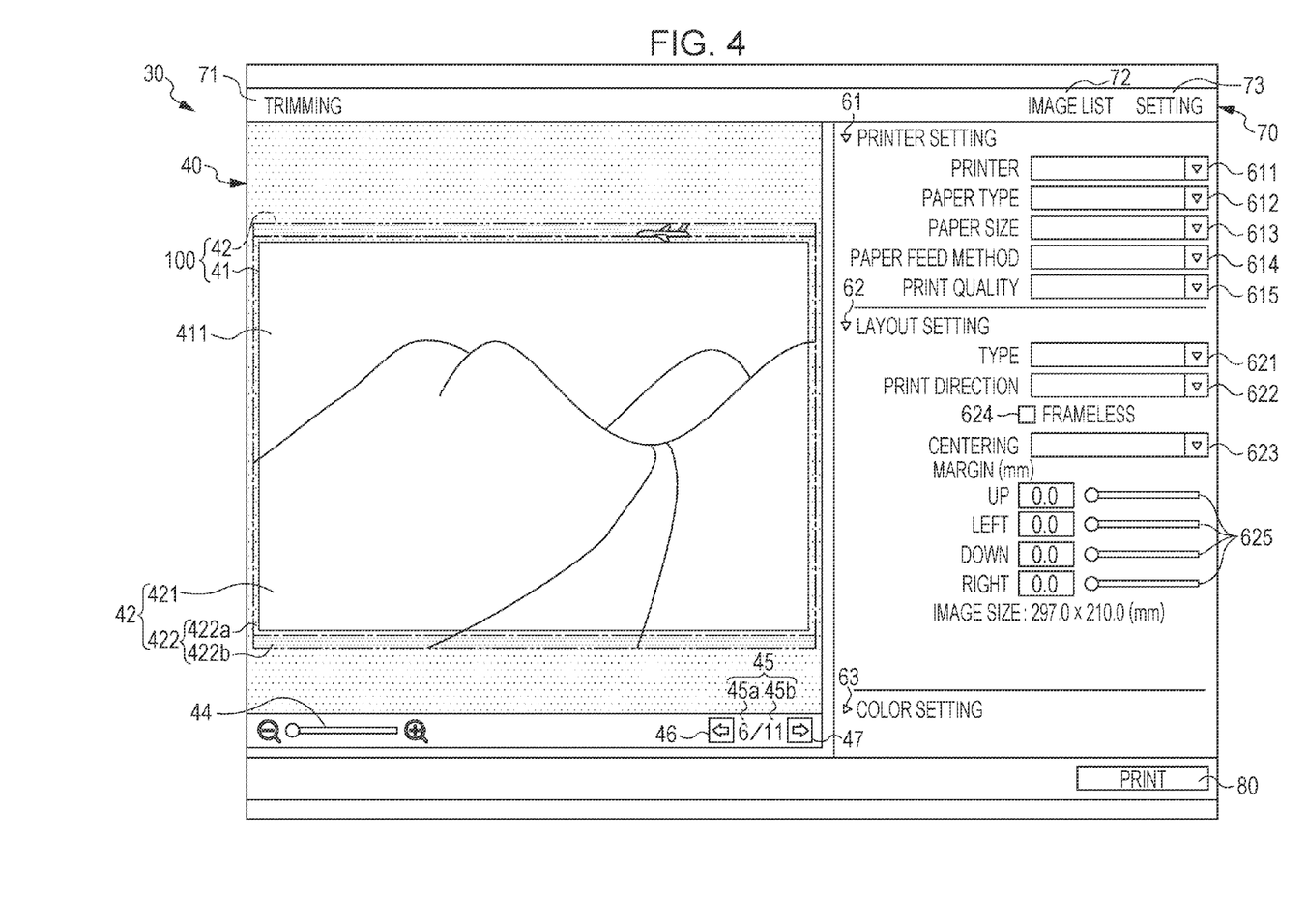
FIG. 4 is a schematic diagram showing a print setting screen when a borderless printing is set.

When the image list panel 72 is selected, the image list window 50 is changed from a display state to a non-display state or from the non-display state to the display state (see FIGS. 3 and 4). In the same manner, when the setting panel 73 displayed on the right side of the image list panel 72 is selected, a display state of the setting window 60 is changed.

When the print button 80 is selected, data of the print setting and image data which are set on the print setting screen 30 are transmitted from the image display control device 11 to the printing device 12 and the image is printed on a paper by the printing device 12 in a manner of the layout shown by the pre-display image 100.

Next, the setting columns 61, 62, and 63 displayed in the setting window 60 will be described. As shown in FIG. 3, the image list window 50 is in the non-display state in the print setting screen 30, so that the layout window 40 is largely displayed in a state in which the size of the layout window 40 in the vertical direction is the same as the size of the setting window 60 in the vertical direction.

In the printer setting column 61, from up to down, a total of five lists, which are a printer selection list 611, a paper type selection list 612, a paper size selection list 613, a paper feed method selection list 614, and a print quality selection list 615, are sequentially aligned and displayed in the vertical direction.

In the printer selection list 611, at least one printer (the printing device 12) communicably connected to the image display control device 11 is displayed. It is possible to select one of the displayed printers. The selected printer receives data transmitted from the image display control device 11 and prints an image on a paper.

In the paper type selection list 612, at least one paper type that can be used in the printer selected in the printer selection list 611 is displayed. For example, the paper type includes glossy paper and plain paper.

In the paper size selection list 613, at least one paper size that can be used in the printer selected in the printer selection list 611 is displayed. For example, the paper size includes A4 size and postcard size. In the present embodiment, A4 (297.0×210.0 mm) is set as the paper size.

In the paper feed method selection list 614, at least one paper feed method that can be used in the printer selected in the printer selection list 611 is displayed. For example, there are paper feed methods from a paper cassette and a manual feed tray.

In the print quality selection list 615, at least one print quality setting that can be used in the printer selected in the printer selection list 611 is displayed. For example, there are print quality settings such as "fine" where high quality printing is performed although the print speed is slow and "normal" where normal quality printing is performed although the print speed is fast.

In the layout setting column 62, from up to down, a total of three lists, which are a type selection list 621, a print direction selection list 622, and a centering selection list 623, are sequentially displayed. Further, a frameless print selection box 624, margin setting slide bars 625, a color of margin selection box 626, and a fixed aspect ratio box 627 are displayed. Further, image size information 628 representing a size of a print area 421 (a first area) which is set so as to correspond to the area 411 to be printed in the picture image 42 is also displayed. These print setting items are aligned and displayed in the vertical direction in the layout setting column 62.

In the type selection list 621, various layout types of the pre-display image 100 are displayed. For example, there are layout types such as a standard layout as shown in FIGS. 2 to 4 and a panoramic layout not shown in the drawings.

In the print direction selection list 622, an orientation of a paper with respect to the print direction such as "vertical" or "horizontal" is displayed. In the present embodiment, the orientation of a paper with respect to the print direction is set to "horizontal". The centering selection list 623 is interlocked with the margin setting slide bars 625 described later. In the centering selection list 623, a setting such as, "non" and "center", related to the arrangement of the picture image 42 with respect to the paper image 41 is displayed. For example, when the "center" is selected, the picture image 42 is arranged so that the center of the picture image 42 is positioned at the center of the paper image 41 displayed in the layout window 40. In other words, regarding margins of the pre-display image 100, the top margin and the bottom margin are the same, and the left margin and the right margin are the same.

When the frameless print selection box 624 is selected, the print setting is changed from print with frame to frameless print or from frameless print to print with frame. In the print setting screen 30 immediately after the start-up, the print with frame is set, and when the frameless print selection box 624 is selected, a check mark is given to the checkbox as shown in FIG. 4 and the frameless print is set. When the print setting is changed to the frameless print, the pre-display image 100 is changed to an image of the frameless print (see FIG. 4).

In the margin setting slide bars 625, top, bottom, left, and right margins of the pre-display image 100 are respectively displayed, and further, these margins can be individually set. In the pre-display image 100 shown in FIG. 3, the margins provided at the top and the bottom are 10.5 mm and the margins provided at the left and the right are 22.5 mm.

When the color of margin selection box 626 is selected, the color of the margins provided to the pre-display image 100 can be selected. When the fixed aspect ratio box 627 is selected, the aspect ratio of the picture image 42 displayed in the layout window 40 is fixed. In other words, in a state in which the fixed aspect ratio box 627 is selected, the amount of margins set by the margin setting slide bars 625 is limited to an amount where the aspect ratio of the picture image 42 is maintained.

When the frameless print selection box 624 is selected, settings other than the type selection list 621 and the print direction selection list 622 cannot be operated in the layout setting column 62.

When the color setting column 63 is selected, a color type setting list (not shown in the drawings) where a color type is set is displayed, so that it is possible to set a color, such as color, monochrome, and grayscale, of an image to be printed on a paper.

Next, the pre-display image 100 during the frameless print will be described. As shown in FIG. 4, the pre-display image 100 during the frameless print is displayed in the layout window 40. The pre-display image 100 during the frameless print is enlarged and displayed so that the picture image 42 occupies the entire area of the area 411 to be printed of the paper image 41 as compared with the pre-display image 100 before the frameless print is set as shown in FIGS. 2 and 3. Therefore, the image size information 628 indicates a value that is the same as A4 size. In other words, the size of the area 411 to be printed of the paper image 41 corresponds with the size of the print area 421 of the picture image 42, so that the picture image 42 is displayed in a state in which there is no margin in the paper image 41.

In the pre-display image 100, the picture image 42 is divided into the print area 421 (the first area) that is set so as to correspond to the area 411 to be printed of the paper image 41 and a non-print area 422 which is outside the print area 421 and which protrudes outside from the area 411 to be printed of the paper image 41. Further, the non-print area 422 is divided into a protrusion area 422a (a second area) located relatively inside and a cutoff area 422b (a third area) outside the protrusion area 422a and displayed. By the way, the print area 421 (the first area) and the protrusion area 422a (the second area) are areas where a printing operation is performed by ejecting ink or the like during the frameless print, and the cutoff area 422b (the third area) is an area where no printing operation using ejection of ink or the like is performed during the frameless print. In other words, depending on variation of the paper size and position and posture of the paper when the paper is transported, during the frameless print, there is a possibility that a portion where print is not performed is generated on the paper in the print area 421 (the first area) and there is a possibility that a portion where print is performed is generated on the paper in the protrusion area 422a (the second area). The cutoff area 422b (the third area) is an area where it is certain that print is not performed.

In the pre-display image 100, the print area 421, the protrusion area 422a, and the cutoff area 422b are displayed in different display formats respectively. In the present embodiment, the display formats are different such as, the transparency of the print area 421 is 0%, the transparency of the protrusion area 422a is 50%, and the transparency of the cutoff area 422b is 70%, so that it is possible to visually differentiate each area. The transparency 0% means that an image is displayed so that the image is visually seen in a state in which the image is not transparent at all, and the transparency 100% means that an image is displayed so that the image is not visually seen in a state in which the image is perfectly transparent.

Figure 5:
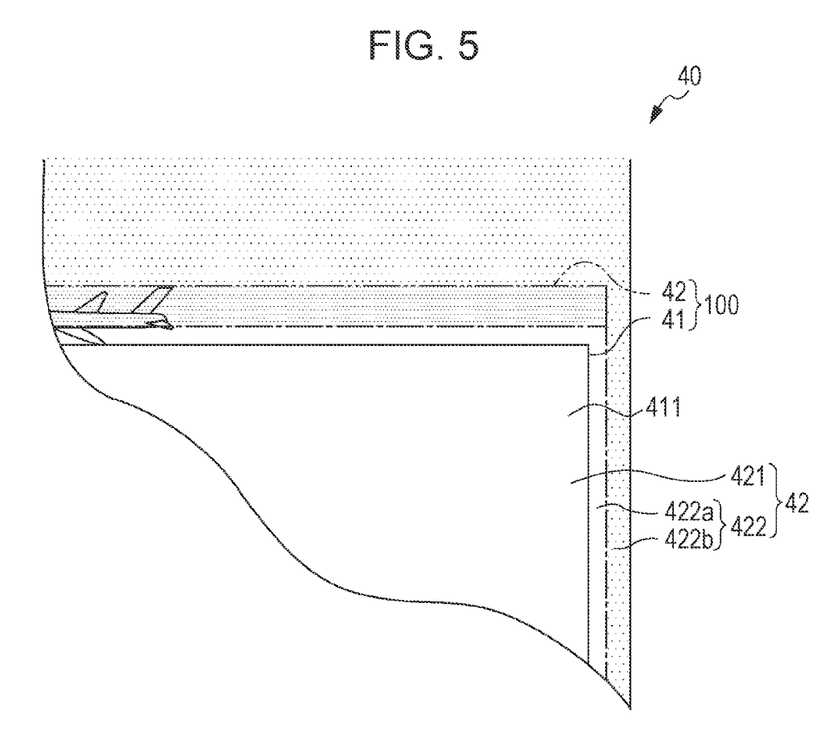
FIG. 5 is a schematic diagram enlarging a part of a pre-display image in FIG. 4.

As shown in FIGS. 4 and 5, the protrusion area 422a is an area a size larger than the print area 421 and is displayed outside the print area 421 so as to surround the print area 421. Next, the cutoff area 422b is displayed outside the protrusion area 422a and only in an upper area and a lower area in the pre-display image 100. In other words, in the present embodiment, the length of the cutoff area 422b in the horizontal direction is the same as the length of the protrusion area 422a in the horizontal direction.

Figure 6A:
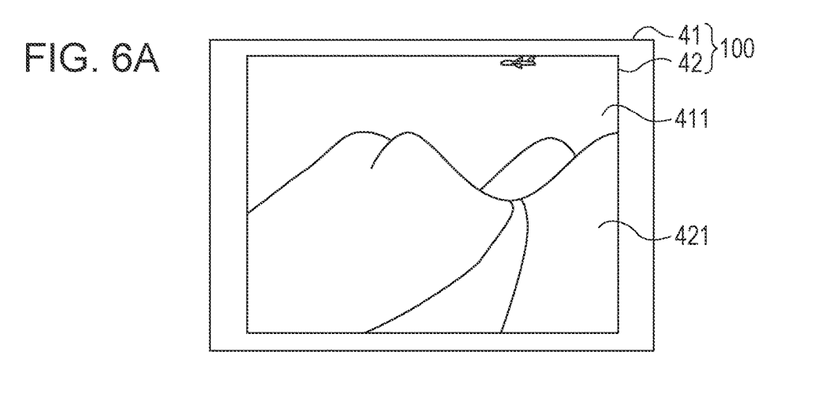
FIG. 6A is a diagram before the borderless printing is set.

Next, an operation of the image display control device 11 that enlarges the pre-display image 100 when the frameless print selection box 624 is selected will be described with reference to FIGS. 6A to 6C. As shown in FIG. 6A, before the frameless print selection box 624 is selected, the print with frame is set where an image is printed with margins being provided to a paper. Therefore, in the pre-display image 100, the picture image 42 is overlapped with the paper image 41 and displayed in a state in which margins are provided to the paper image 41. In other words, the pre-display image 100 is displayed in a state in which the print area 421 is smaller than the area 411 to be printed. Here, the size of the picture image 42 shown in FIG. 6B is 252.0× 188.9 mm (from the image size information 628 in FIG. 3).

Figure 6B:
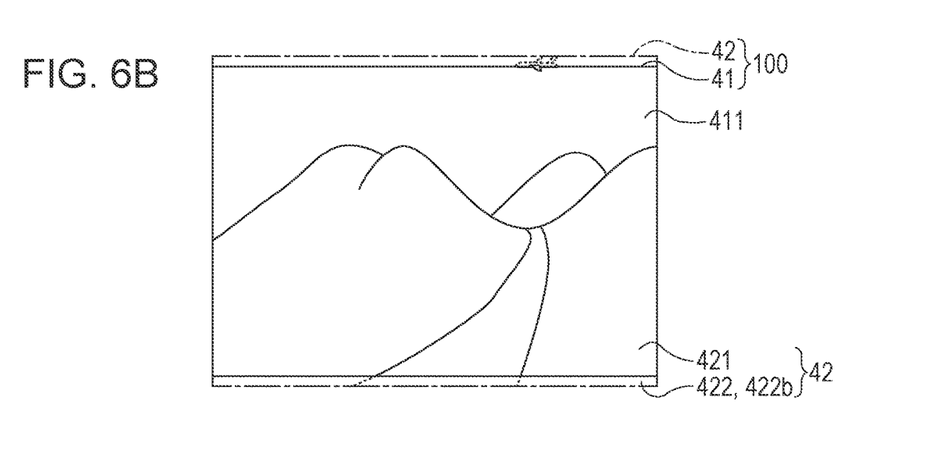
FIG. 6B is a diagram showing that the borderless printing is set and an image is enlarged by a first enlargement stage.

Next, as shown in FIG. 6B, when the frameless print selection box 624 is selected, first, the picture image 42 is enlarged so as to occupy the entire area of the area 411 to be printed of the paper image 41 (first enlargement stage). Specifically, the size of the picture image 42 is enlarged until a smaller one between a ratio of the vertical size of the picture image 42 to the vertical size of the paper image 41 and a ratio of the horizontal size of the picture image 42 to the horizontal size of the paper image 41 becomes 100%. In the present embodiment, the smaller one is the ratio of the horizontal size of the picture image 42 to the horizontal size of the paper image 41, so that the picture image 42 is enlarged until the horizontal size of the picture image 42 becomes equal to the horizontal size of the paper image 41 (becomes 210 mm) while maintaining the aspect ratio.

Here, although the horizontal size of the picture image 42 is equal to the horizontal size of the paper image 41, the vertical size of the picture image 42 is not equal to the vertical size of the paper image 41 because the aspect ratio is not 1:1. Therefore, an upper area and a lower area of the picture image 42 are protruded from the area 411 to be printed of the paper image 41 and displayed. A portion protruding from the area 411 to be printed in the first enlargement stage is set as the cutoff area 422b, which is an area where a printing operation such as ejection of ink by the printing device 12 is not performed.

Figure 6C:
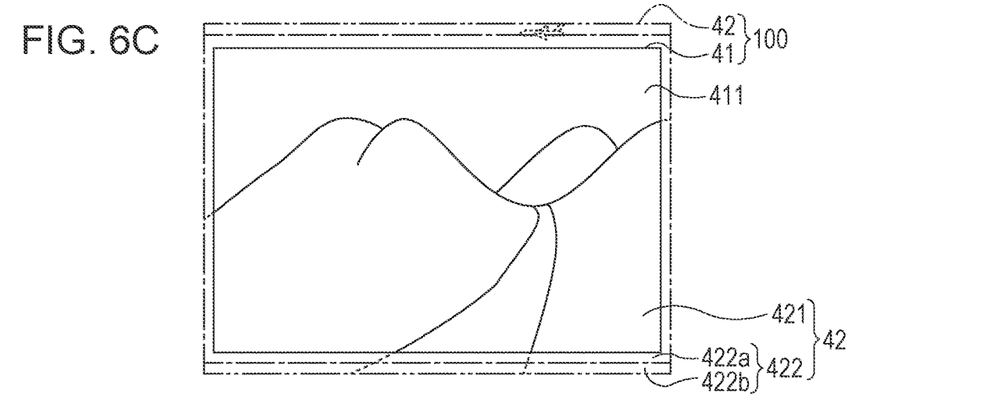
FIG. 6C is a diagram showing that the borderless printing is set and an image is enlarged by a second enlargement stage.

Next, as shown in FIG. 6C, after the first enlargement stage, the picture image 42 is further enlarged with respect to the area 411 to be printed of the paper image 41. This is to reduce a risk that a white space is generated in an edge portion of a paper because of a reason that the size (accuracy) of the paper varies or printing is performed while the paper is transported in a skewed state in the printing device 12.

Therefore, the picture image 42 is further enlarged so that the picture image 42 becomes a size larger than the area 411 to be printed of the paper image 41 (second enlargement stage). In the second enlargement stage, the picture image 42 is enlarged so that the picture image 42 surrounds the paper image 41 while the aspect ratio of the picture image 42 is maintained. Therefore, different from the first enlargement stage, not only upper and lower areas of the picture image 42, but also right and left areas of the picture image 42 are protruded from the area 411 to be printed of the paper image 41 and displayed. In the pre-display image 100, an area that is protruded from the area 411 to be printed in the second enlargement stage is set as the protrusion area 422a. Different from the cutoff area 422b, the protrusion area 422a is an area where the printing operation of the printing device 12 is performed.

As described above, depending on the variation of the size of a paper used as a medium and a skew of the paper when the paper is transported, a printing operation such as ejection of ink is performed in a portion displayed in the protrusion area 422a in the entire area of the picture image 42, so that printing may be performed on a paper corresponding to the portion. For example, as in the pre-display image 100 shown in FIG. 6C, when an airplane is displayed in an area portion from the cutoff area 422b to the protrusion area 422a, if printing is actually performed, a part of the airplane displayed in the protrusion area 422a may be printed on a paper. If the airplane is not desired to be printed on a photograph or a paper, it is possible to reliably prevent the airplane from being printed on a paper by editing the pre-display image 100 in the print setting screen 30 and putting the airplane in the cutoff area 422b.

In the present embodiment, the cutoff area 422b is an area which is upper and lower edges of the picture image 42. However, the cutoff area 422b may be set in an area which is left and right edges of the picture image 42 depending on the aspect ratios of the paper and the image.

According to the above embodiment, it is possible to obtain the effects as described below. (1) In the pre-display image 100, an area located outside the area 411 to be printed of the print area 41 is displayed by being divided into the protrusion area 422a where the printing operation is performed and the cutoff area 422b where no printing operation is performed. Therefore, it is possible to know an area where the printing operation is performed and an area where no printing operation is performed in the image area of the pre-display image 100. Therefore, it is possible to accurately know a print result of the borderless printing that prints an image in a state in which no margin is included in a paper by seeing the pre-display image 100 before printing.

(2) In the pre-display image 100, it is possible to visibly and distinctly display the print area 421, the protrusion area 422a, and the cutoff area 422b. (3) In the pre-display image 100, the cutoff area 422b where the printing operation is not performed by the printing device 12 is displayed with transparency higher than that of the print area 421 and the protrusion area 422a where the printing operation is performed, so that the cutoff area 422b is difficult to be seen visually. Therefore, an area where the printing operation is performed can be more visibly displayed than an area where the printing operation is not performed.

The above embodiment can be modified as described below. In the above embodiment, the protrusion area 422a need not necessarily be displayed in a display format whose transparency is higher than that of the print area 421. The protrusion area 422a may be displayed in a display format whose transparency is lower than that of the print area 421.

In the above embodiment, the cutoff area 422b may be displayed with a color or may be filled with a color instead of being displayed by changing the transparency. For example, when the cutoff area 422b is filled with the same color as that of the background of the layout window 40, the cutoff area 422b can be seen distinctly from the print area 421 and the protrusion area 422a where the printing operation is performed by the printing device 12 because the cutoff area 422b is displayed with the same color as that of the background.

In the pre-display image 100, the print area 421, the protrusion area 422a, and the cutoff area 422b may be segmented by displaying a dotted line or the like on boundaries between the areas. In the above embodiment, the first enlargement stage and the second enlargement stage may be performed at the same time. The enlargement processing of the picture image 42 during the frameless print is not limited to that in the above embodiment.

In the above embodiment, the print setting screen 30 displayed on the display unit 13 by executing the print result pre-display program is not limited to aspects as shown in FIGS. 2 to 4. For example, the image list window 50 and the trimming panel 71 need not be included and a button having another function may be provided. The position and the form of the layout window 40 and the setting window 60 displayed on the print setting screen 30 are not limited to those of the above embodiment.

The entire disclosure of Japanese Patent Application No. 2014-223666, filed Oct. 31, 2014 is expressly incorporated by reference herein.

What is claimed is:

1. An image display control device comprising:
a control unit comprising a processor and a non-transitory computer readable storage medium, the control unit configured to control a pre-display image displayed on a display unit that displays a print result of an image to be printed on a print medium by a printing device as the pre-display image before the printing is performed,
wherein the control unit causes the display unit to display the pre-display image, which is displayed when the printing device prints the image on an area to be printed on the print medium without margins, by dividing the pre-display image into at least three areas, including:
a first area that is set corresponding to the area on the print medium on which the image is to be printed,
a second area which is outside the first area and for which ejection of ink is performed by the printing device to prevent white space being generated due to a size of the medium or a position of the medium, and
a third area which is outside the second area and for which ejection of ink is not performed.

2. The image display control device according to claim 1, wherein
in the pre-display image, the first area, the second area, and the third area are displayed in different display formats respectively.

3. The image display control device according to claim 1, wherein
the pre-display image is displayed in a display format in which transparency of the third area where the printing operation is not performed by the printing device is higher than that of the first area and the second area where the printing operation is performed by the printing device.

4. A print result pre-display method that displays a print result of an image to be printed on a print medium by a printing device as a pre-display image before the printing is performed, wherein
the print result pre-display method displays the pre-display image, which is displayed when the printing device prints the image on an area to be printed on the print medium without margins, by dividing the pre-display image into at least three areas, including:
a first area that is set corresponding to the area on the print medium on which the image is to be printed,
a second area which is outside the first area and for which ejection of ink is performed by the printing device to prevent white space being generated due to a size of the medium or a position of the medium, and
a third area which is outside the second area and for which ejection of ink is not performed.

5. A non-transitory computer readable medium storing instructions executable by a control unit of an image display control device, the control unit configured to control a pre-display image displayed on a display unit that displays a print result of an image to be printed on a print medium by a printing device as the pre-display image before the printing is performed that, when executed, cause:
the control unit to execute a display processing step that displays the pre-display image, which is displayed when the printing device prints the image on an area to be printed on the print medium without margins, by dividing the pre-display image into at least three areas, including:
a first area that is set corresponding to the area on the print medium on which the image is to be printed,
a second area which is outside the first area and for which ejection of ink is performed by the printing device to prevent white space being generated due to a size of the medium or a position of the medium, and
a third area which is outside the second area and for which ejection of ink is not performed.

* * * * *